United States Patent
Lombardini

(10) Patent No.: US 10,265,902 B2
(45) Date of Patent: Apr. 23, 2019

(54) THERMOREGULATION SYSTEM OF ROTATING CYLINDERS IN PLANTS FOR EXTRUSION AND CONVERSION/TRANSFORMATION OF PLASTIC FILMS BY INFRARED HEATERS

(71) Applicant: Colines S.p.A., Novara (NO) (IT)

(72) Inventor: Nicola Lombardini, Oleggio (IT)

(*) Notice: Subject to any disclaimer, the term of this patent is extended or adjusted under 35 U.S.C. 154(b) by 143 days.

(21) Appl. No.: 15/432,967

(22) Filed: Feb. 15, 2017

(65) Prior Publication Data

US 2017/0232654 A1  Aug. 17, 2017

(30) Foreign Application Priority Data

Feb. 16, 2016 (IT) .................. 102016000015563

(51) Int. Cl.
*F26B 3/30* (2006.01)
*B29B 13/02* (2006.01)
*B29B 13/04* (2006.01)
*B29C 33/06* (2006.01)
*B29C 35/02* (2006.01)
(Continued)

(52) U.S. Cl.
CPC ........ B29C 47/8845 (2013.01); B29B 13/023 (2013.01); B29B 13/04 (2013.01); B29C 33/065 (2013.01); B29C 35/0288 (2013.01); B29C 43/24 (2013.01); B29C 43/46 (2013.01); B29C 43/52 (2013.01); B29C 47/8805 (2013.01); B29C 47/92 (2013.01); B29C 51/421 (2013.01); H05B 3/0057 (2013.01); *B29C 47/0021* (2013.01); *B29C 47/0057* (2013.01); *B29C 47/0061* (2013.01); *B29C 47/34* (2013.01); *B29C 59/04* (2013.01); *B29C 2035/0822* (2013.01); *B29C 2043/462* (2013.01); *B29C 2947/92704* (2013.01); *B29C 2947/92923* (2013.01); *B29C 2947/92961* (2013.01); *B29K 2023/0633* (2013.01)

(58) Field of Classification Search
None
See application file for complete search history.

(56) References Cited

U.S. PATENT DOCUMENTS 3,519,253 A * 7/1970 Schwartz ........... G03G 15/2007
  118/61
3,709,472 A * 1/1973 Kreitz .................. G03D 13/002
  396/571
(Continued)

FOREIGN PATENT DOCUMENTS

EP  0051847  5/1982
EP  2014464  1/2009
(Continued)

OTHER PUBLICATIONS

Italian Ministry of Economic Development, Search Report, Italian Patent Application No. 102016000015563, dated Oct. 5, 2016.

*Primary Examiner* — Thor S Campbell
(74) *Attorney, Agent, or Firm* — Themis Law

(57) ABSTRACT

A thermoregulation system of rotating metal cylinders in plants for the extrusion and conversion/transformation of plastic films includes heating elements applied to each rotating cylinder, wherein the heating elements are infrared heating elements, and wherein the rotating cylinder includes a metal tube rotating around a fixed shaft, which is rigidly connected to two side plates.

8 Claims, 2 Drawing Sheets

(51) Int. Cl.
*B29C 43/24* (2006.01)
*B29C 43/46* (2006.01)
*B29C 43/52* (2006.01)
*B29C 47/88* (2006.01)
*B29C 47/92* (2006.01)
*B29C 51/42* (2006.01)
*H05B 3/00* (2006.01)
*B29C 35/08* (2006.01)
*B29C 47/00* (2006.01)
*B29C 47/34* (2006.01)
*B29C 59/04* (2006.01)
*B29K 23/00* (2006.01)

(56) References Cited

U.S. PATENT DOCUMENTS

| | | | | |
|---|---|---|---|---|
| 4,054,410 A | * | 10/1977 | Murphy | G03G 15/2064 118/60 |
| 4,064,933 A | * | 12/1977 | Schuman | F28D 11/02 165/104.21 |
| 4,367,036 A | * | 1/1983 | Sakamaki | G03G 21/203 355/30 |
| 4,724,303 A | * | 2/1988 | Martin | H05B 3/0095 219/216 |
| 5,070,231 A | * | 12/1991 | Bacus | G03G 15/2053 219/216 |
| 5,157,238 A | * | 10/1992 | Landa | G03G 13/20 219/216 |
| 5,915,072 A | * | 6/1999 | Campbell | A61G 11/00 219/411 |
| 2010/0086336 A1 | * | 4/2010 | Izawa | G03G 15/10 399/336 |
| 2010/0216963 A1 | | 8/2010 | Ueda | |
| 2013/0105101 A1 | * | 5/2013 | Turunen | D21F 3/08 162/297 |

FOREIGN PATENT DOCUMENTS

| | | |
|---|---|---|
| JP | 2009137177 | 6/2009 |
| WO | 0132423 | 5/2001 |
| WO | 2013160191 | 10/2013 |

* cited by examiner

THERMOREGULATION SYSTEM OF ROTATING CYLINDERS IN PLANTS FOR EXTRUSION AND CONVERSION/TRANSFORMATION OF PLASTIC FILMS BY INFRARED HEATERS

FIELD OF THE INVENTION

The present invention relates to a thermoregulation system of rotating metal cylinders in applications relating to plants for the extrusion and conversion/transformation of plastic films consisting of a variety of polymeric raw materials.

More specifically, the invention relates to a cylinder designed for the above-mentioned applications, which is heated/thermo-regulated by means of infrared heating elements.

The invention also relates to a method for heating a rotating metal cylinder in plants for the extrusion and conversion/transformation of plastic films, which comprises the use of a plurality of infrared heating elements.

BACKGROUND OF THE INVENTION

Metal cylinders, which may be provided with coatings of rubber or other materials, must typically be cooled during extrusion processes, in which the molten product produced by an extruder and formed by a spinneret (a flat, round or profiled spinneret) is cooled by means of direct contact with one or more cylinders, either immediately after the extrusion (typical situation of plants in which the "cast" technology is used) or after a first cooling in air (typical situation of plants in which the "blown" technology is used).

The cooling of these cylinders is generally achieved by the passage of a cold fluid inside the cylinders, which are therefore cooled by conduction, and which, in turn, again exploiting the thermal conduction, provide for the cooling of the molten mass cast onto the cylinders.

The need to heat the metal cylinders, where a well-defined temperature must be guaranteed for the freshly extruded film or films coming from a previously formed reel (in the case of converting plants), is equally frequent and important.

There are numerous cases in which the metal cylinders must be heated, which, in turn, again by means of a thermal exchange by direct contact, provide the plastic film in question with heat until it is brought to the desired temperature. An exemplary case are coupling processes between films having a compatible molecular chemical structure, wherein the surface heating of the areas in contact up to a temperature slightly higher than the Vicat temperature provides for a "welding" between the two films, or all thermoforming processes in continuous wherein the film or sheet must be brought close to the softening point to enable a permanent plastic deformation with the support of light forces.

Another application typical of extrusion lines or off-line processes (i.e. starting from reels of film already produced on any type of filming plant) is the embossing of films, i.e. the impression of a particular geometry or pattern due to pressing on the film by a rubberized cylinder against a second cylinder having a surface characterized by that pattern. Also in this case, specific thermal contents, and consequently specific temperatures, must be reached to ensure that the embossing is impressed on the film as a permanent plastic deformation even with the use of relatively low pressure forces.

An extremely important application that requires a heating process of the plastic film up to very specific temperatures is that which imposes a so-called "orientation" on the film, i.e. a permanent plastic deformation suitable for reducing the starting thickness of the film and consequently increasing the other two dimensions (or only one, in the case of "mono-orientation") by means of a so-called stretching process of the film. This process, like the previous discussed processes, can be performed either starting from reels of previously produced film with any type of extrusion and filming plant, or "online" in said plants, and basically consists in stretching the plastic film in one or two directions, previously brought to temperatures close to the softening point.

This process is utilized for providing the film with specific physico-mechanical characteristics, which, in the absence of orientation or mono-orientation, would be absent or much lower.

By way of example, two representative cases can be mentioned:

1. The mono-orientation of a mixture substantially and preferably consisting of low-density polyethylenes, or linear low-density polyethylenes (also with a metallocene matrix), or random or block or heterophase polypropylene copolymers, or polypropylene homopolymers or other polyolefins or even other thermoplastic materials in general, combined with inorganic fillers such as calcium carbonate, or talc or glass fiber or in any case any other type of filler in general, in percentages ranging from a few units until over 60%.

Said mono-orientation basically (but not exclusively) has the purpose of creating micropores in the polymer chain, otherwise without any solution of continuity, due to "fractures" caused by said inorganic fillers during the controlled lengthening process; as this mechanical stretching process is carried out with the polymeric material at a temperature close to the softening point, and compatibly with the dimension and particle size of the inorganic fillers, the size of these fractures can be very accurately managed, to the point of being able to not overcome the surface tension of various types of liquids.

In this way, it is therefore possible to provide the film in question with very specific "permeability" characteristics to gases but not to specific liquids, so as to retain the same but not any possible gases.

This, for example, is the typical process used in the production of so-called "breathable" or transpiring films, used more and more frequently in applications for films in the sanitary sector.

2. The mono-orientation of a mixture substantially and preferably consisting of low-density polyethylenes, or linear low-density polyethylenes (also with a metallocene matrix), or random or block or heterophase polypropylene copolymers, or polypropylene homopolymers or other polyolefins or even other thermoplastic materials in general.

In this case, the orientation or mono-orientation is utilized for mechanically characterizing the film in question above all (but not exclusively) from the point of view of tensile strength and breaking strength.

In particular, in the case of film prevalently and preferably consisting of random or block or heterophase polypropylene copolymers, or polypropylene homopolymers, the particular conformation of the polymer chain ensures that the same, if subjected to an orientation action, exponentially increases its mechanical characteristics of tensile strength in the same orientation direction.

Without entering into a physico-chemical explanation of the phenomenon (essentially due to the Van Der Waals bonding forces between the molecules of the polymer), it is sufficient to say that depending on the type of material and type of lengthening ratio effected, the tensile strength characteristics can also increase by several tens of times.

What is indicated above clearly illustrates the importance and diffusion of the necessity of heating films of plastic material up to specific temperatures, preferably and basically by direct contact with rotating cylinders, in turn heated.

The heating of these cylinders is effected in the state of the art by means of hot fluids, whether they be heated or overheated water (therefore also at temperatures higher than 100 degrees, if pressurized), oil, vapour or any other type of fluid, which heats the cylinders directly by internal contact.

This process obviously implies the presence of a heating unit outside the cylinder in contact with the plastic film, wherein the fluid in question is brought to the desired temperature by means of electric resistances, or open flame, or gas, or any other heating system.

The fluid is then transported to the cylinder in contact with the plastic film by means of adequate recirculation systems, such as centrifugal pumps or gear pumps, screw- or piston-compressors, etc., the temperature of the same is then measured by means of suitable reading systems (thermometers, pyrometers), which provide the management system of the same with the reference signal.

This process, common to all applications relating to extrusion or converting plants for plastic films, has various evident and unsolved problems:

1. Poor energy efficiency: in addition to the efficiency of the electric resistances and dispersion of part of the heat supplied in the environment (any insulating system may not be absolute, in addition to preventing or in any case making normal maintenance operations difficult), there are also thermal dispersions in the environment linked to the transportation system of the hot fluid from the heating unit to the cylinder in contact with the plastic film, which is clearly greater, the greater the distance between said heating unit and the cylinder(s).

2. Temperature control: in the systems described above, the temperature of the heating fluid is revealed, and the management of the thermoregulation relates to this signal. What is not controlled, therefore, is the temperature which is most important for the process, i.e. that of the plastic film.

The presence of numerous thermal passages (from the heating unit to the carrier fluid, from the carrier fluid to the cylinder in contact with the plastic film, and finally, as already mentioned, from the cylinder itself to the plastic film) would induce an excessive transition if the whole system were managed by directly detecting the temperature of the plastic film, triggering temperature swings detrimental for the success of the entire process.

3. Complexity: a system such as that described is undoubtedly composed of numerous units and an extremely important plant design, consisting of a heating unit, the transporting system of the carrier fluid, the construction of a cylinder provided with all the features required for a better utilization of the thermal capacity of the carrier fluid (internal double-wall coiling, for best using the caloric content of the carder fluid).

JP 2009 137177A relates to a thermoregulation system of rotating metal cylinders in which infrared heating elements are provided.

WO 2013/160191 A1 relates to cylinders that can be used as operating cylinders of a printing or embossing machine.

SUMMARY OF THE INVENTION

The present invention has the objective of providing a more economical, efficient and functional heating system of a cylinder in contact with a plastic film than systems in the prior art.

The invention solves the previously discussed problems by eliminating them at the root, in one embodiment using resistances that exploit infrared technology with components assembled directly inside the cylinder in contact with the plastic film.

The invention provides a number of advantages, which include:

Greater energy efficiency due to the presence of a single heat carrier, in this case consisting of the cylinder in contact with the plastic film and no longer a previously heated fluid;

Elimination of the entore plant engineering related to the connection between the heating unit of the carrier fluid (now absent), the transportation of the carrier fluid, and the special configuration of the cylinder in contact with the plastic film to be heated;

Direct management of the temperature of the plastic film due to a single passage of heat, which significantly reduces the thermal transition between the required temperature gradient and the effective action of the heating means (e.g. infrared resistance);

No less important, management of various temperatures related to the same cylinder, because bands of resistances can be used in a direction longitudinal to the movement of the plastic film with different powers or simply with different temperature settings.

The above mentioned objectives and advantages are achieved with a cylinder having the featured recited in the enclosed claims.

BRIEF DESCRIPTION OF THE DRAWINGS

The structural and functional characteristics of the invention and its advantages with respect to the known art will appear more clearly understandable from the following description referring to the enclosed schematic drawings, which illustrate a non-limiting practical embodiment of the invention. In the drawings.

DETAILED DESCRIPTION OF EMBODIMENTS OF THE INVENTION

In one embodiment, the invention provides for a rotating cylinder 10 consisting of a tube 11, which can be either iron-steel, or aluminum, or any other material, compatibly with the temperatures to be reached and with the mechanical characteristics that must be ensured, rotating around a fixed shaft or axis 12, which is rigidly connected to two side plates 13.

Figure 1:
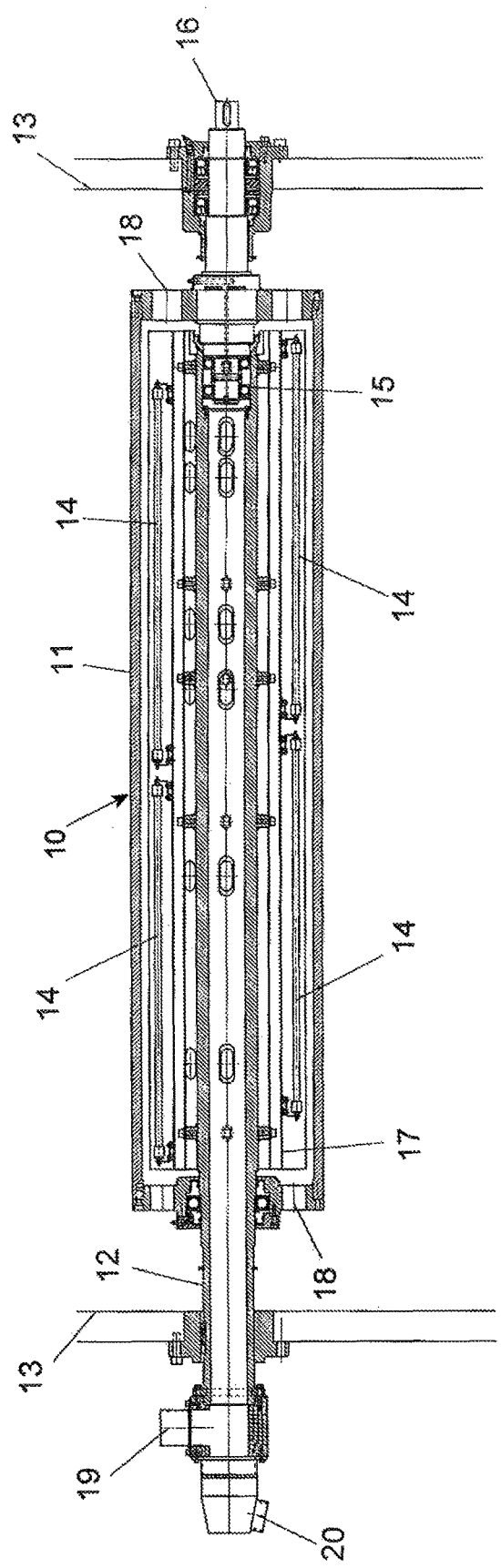
FIG. 1 is a longitudinal section illustrating a cylinder produced according to the invention.
Figure 2:
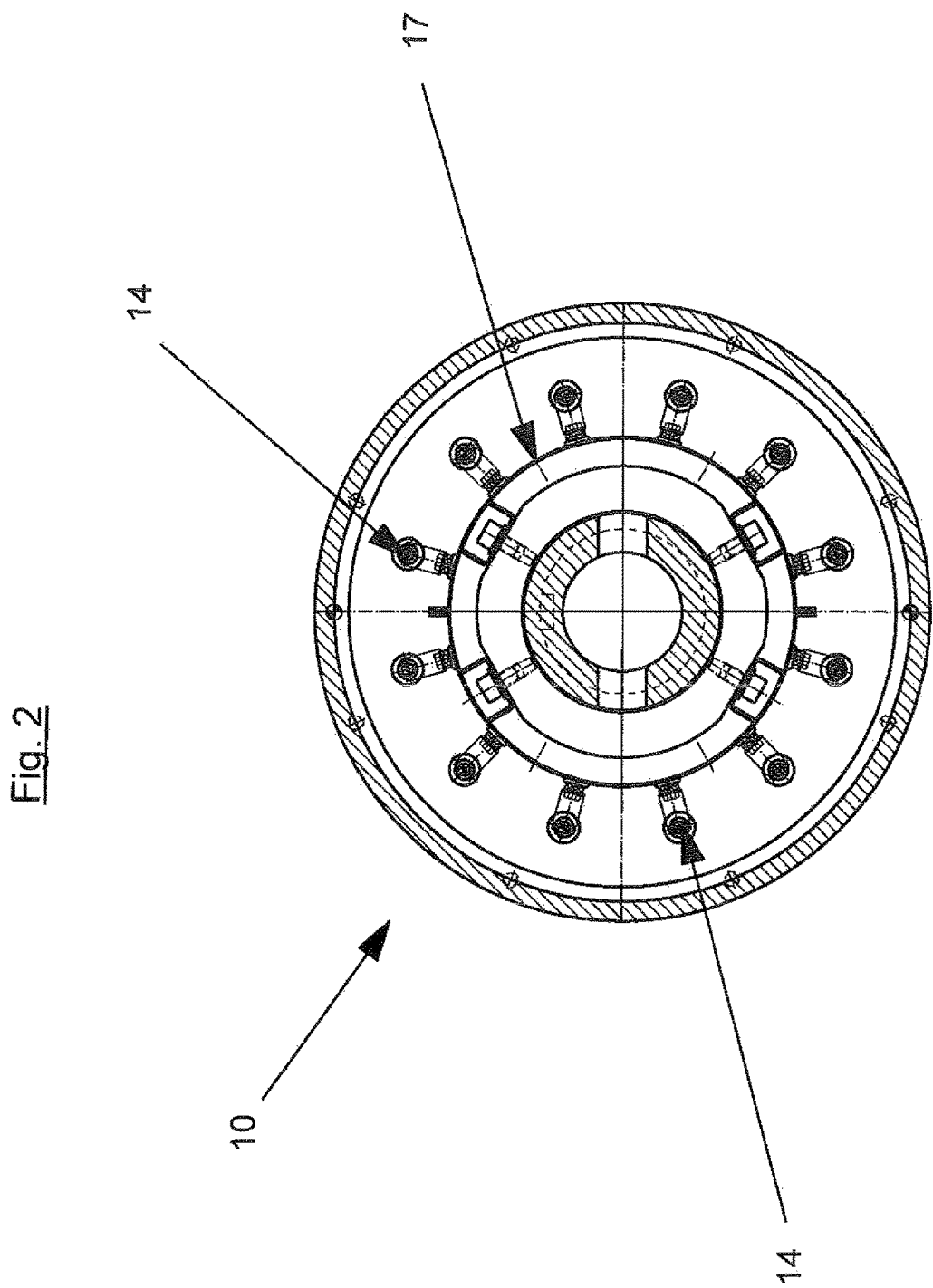
FIG. 2 is an enlarged transversal section of the cylinder of FIG. 1.

According to the invention, depending on the type of material of which the rotating cylinder 10 is composed, various infrared resistances 14, having a wavelength compatible with such material, are applied to the cylinder 10. Said resistances 14 can, for example, be arranged in line, in adjacent groups, as clearly illustrated in FIG. 1 of the drawings.

The rotation of said cylinder 10 with respect to its fixed shaft 12, ensured by bearings 15 or bushings or any other system that enables its relative rotation, can be induced by an external drive wheel, a connection with a pulley or a toothed wheel, or in any case with any available rotation system, which is operatively connected to a power take-off 16.

An annular structure 17, circumferentially carrying the infrared resistances 14, is then rigidly fixed to the fixed axis 12 of the cylinder 10, so that said resistances are stationary with respect to the relative movement of the cylinder 1. This arrangement eliminates the use of rotating electric collectors, which would be necessary if the infrared resistances 14 rotated integrally with the cylinder 10.

In one embodiment, however, elements 14 rotate together with the cylinder, so to ensure different temperature ranges for the cylinder circumferentially.

Vice versa, when the resistances 14 are kept fixed to the central shaft 12 of the cylinder 10, constancy and homogeneity of the quantity of heat supplied to the cylinder are ensured, also in the event of faults of one or more resistances, because the entire cylinder is cyclically enveloped by the heat supplied by each resistance.

The almost complete absence of thermal inertia of the present heating system (apart from that of the cylinder itself, related to the type of material used, the thickness of the wall and, therefore, the type of process for which it is intended, but in any case much lower than in the prior art) enables a direct temperature reading of the film by means of infrared sensors, ultrasound, laser or any other system, thus substantially instantaneously intervening on the power supplied by the infrared resistances 14, which are fed through an electric cable input 20.

The reading of the temperature of the film can be performed in substantially any position, either when the film is still in contact with the cylinder or immediately afterwards. Similarly, the management of the power supplied from the infrared resistances 14 to the cylinder 10 can also be determined by measuring the temperature of the cylinder, when it is impossible, or difficult, or simply not helpful for the process to detect the temperature of the plastic film.

As previously mentioned, arranging the resistances inside the cylinder in bands having a desired width also provides for an independent management of the power supplied by the resistances, creating different thermal gradients on the cylinder in a transversal direction with respect to the movement of the plastic film.

In the event of a sudden stoppage of the cylinder for any reason, which may derive from a process fault upstream or downstream of the cylinder or due to the cylinder itself, the surface of the cylinder may have to be rapidly cooled in order to avoid an excessive increase in the temperature of the plastic film present therein, due to the exponential increase in residence time of the plastic film and, therefore, of the quantity of exchanged heat.

For safeguard in these types of situations, holes 18 can be created, radially positioned on the closing flanges of the cylinder, in turn integral with the cylinder and, therefore, rotating with respect to the fixed shaft. Environmental or cooled air can be blown through these holes 18, fed through a vent 19, to drastically reduce the temperature of both the infrared resistances 14 (in any case having an extremely reduced thermal inertia if compared to any heated fluid) and also of the cylinder 10 itself.

Different air flow-rates can obviously be provided, depending on the type of application, and also, as already mentioned, cooled air may be used, thus increasing, in one case, the convective thermal exchange coefficient and otherwise the ΔT with respect to the surface of the cylinder.

The above mentioned objectives have therefore been achieved.

The scope of protection of the present invention is defined by the following claims.

The invention claimed is:

1. A thermoregulation system of rotating metal cylinders in plants for extrusion and conversion/transformation of plastic films, comprising:
   one or more heating elements applied to each rotating metal cylinder,
   wherein said heating elements are infrared heating elements,
   wherein said rotating metal cylinder comprises a metal tube rotating around a fixed shaft, which is rigidly connected to two side plates,
   wherein a plurality of said infrared heating elements is applied to said metal tube, and
   wherein said infrared heating elements are positioned circumferentially on an annular supporting structure fixed to the shaft of said rotating metal cylinder, so that said infrared heating elements are stationary and immobile with respect to the rotating metal cylinder.

2. The thermoregulation system according to claim 1, wherein said infrared heating elements are positioned in line, in adjacent groups.

3. The thermoregulation system according to claim 1, wherein power is fed to said one or more heating elements through an electric cable input.

4. The thermoregulation system according to claim 1, wherein said rotating cylinder is cooled with environmental air collected through an air vent and blown through holes fluidly coupled to an inside of said rotating cylinder.

5. The thermoregulation system according to claim 1, wherein said infrared heating elements are infrared resistances.

6. The thermoregulation system according to claim 1, wherein said one or more heating elements are rotatable together with the rotating metal cylinder.

7. A cylinder for a thermoregulation system, comprising:
   a plurality of heating elements applied to said cylinder,
   wherein said heating elements are infrared heating elements,
   wherein said cylinder comprises of a metal tube rotating around a fixed shaft, which is rigidly connected to two side plates,
   wherein said plurality of said infrared heating elements is applied to said metal tube, and
   wherein said infrared heating elements are positioned circumferentially on an annular supporting structure fixed to the shaft of said cylinder, so that said infrared heating elements are stationary and immobile with respect to the cylinder.

8. A method of heating a rotating metal cylinder in plants for extrusion and conversion/transformation of plastic films, comprising:
   providing a rotating metal cylinder that comprises a metal tube rotating around a fixed shaft, which is rigidly connected to two side plates; and
   providing a plurality of infrared heating elements, which are applied to said metal tube,
   wherein said infrared heating elements are positioned circumferentially on an annular supporting structure fixed to the shaft of said rotating metal cylinder, so that said infrared heating elements are stationary and immobile with respect to the rotating metal cylinder.

* * * * *